(12) United States Patent
Timmons et al.

(10) Patent No.: US 8,349,478 B2
(45) Date of Patent: Jan. 8, 2013

(54) LITHIUM ION BATTERY FAILURE MITIGATION

(75) Inventors: Adam T. Timmons, Southfield, MI (US); Chang H. Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 12/829,452

(22) Filed: Jul. 2, 2010

(65) Prior Publication Data

US 2012/0003511 A1 Jan. 5, 2012

(51) Int. Cl.
*H01M 10/50* (2006.01)
(52) U.S. Cl. .......................... 429/62; 429/122; 180/313
(58) Field of Classification Search .................... 429/62, 429/120, 122; 180/313
See application file for complete search history.

(56) References Cited

U.S. PATENT DOCUMENTS

| | | | | |
|---|---|---|---|---|
| 5,215,834 A | * | 6/1993 | Reher et al. | ...................... 429/62 |
| 7,041,383 B2 | | 5/2006 | Liu et al. | |
| 7,543,584 B2 | * | 6/2009 | Brookman | ............... 128/205.11 |
| 7,678,494 B2 | * | 3/2010 | Tsuchiya | ........................ 429/120 |
| 8,187,736 B2 | * | 5/2012 | Park et al. | ........................ 429/62 |

* cited by examiner

*Primary Examiner* — Stephen J. Kalafut
(74) *Attorney, Agent, or Firm* — Dinsmore & Shohl LLP

(57) ABSTRACT

A method of mitigating battery cell failure is provided. In one embodiment, the method includes providing a coupling between a battery pack and an internal combustion engine exhaust system, the coupling comprising: a duct positioned between the battery pack and the internal combustion engine exhaust system, the duct including at least one one-way valve positioned to allow battery cell exhaust to pass from the battery cell to the internal combustion engine exhaust system; detecting a thermal event; activating a fan, an air pump, or both in response to the thermal event to force the battery cell exhaust through the coupling; and treating the battery cell exhaust in the internal combustion engine exhaust system. Battery failure mitigation systems are also described.

21 Claims, 1 Drawing Sheet

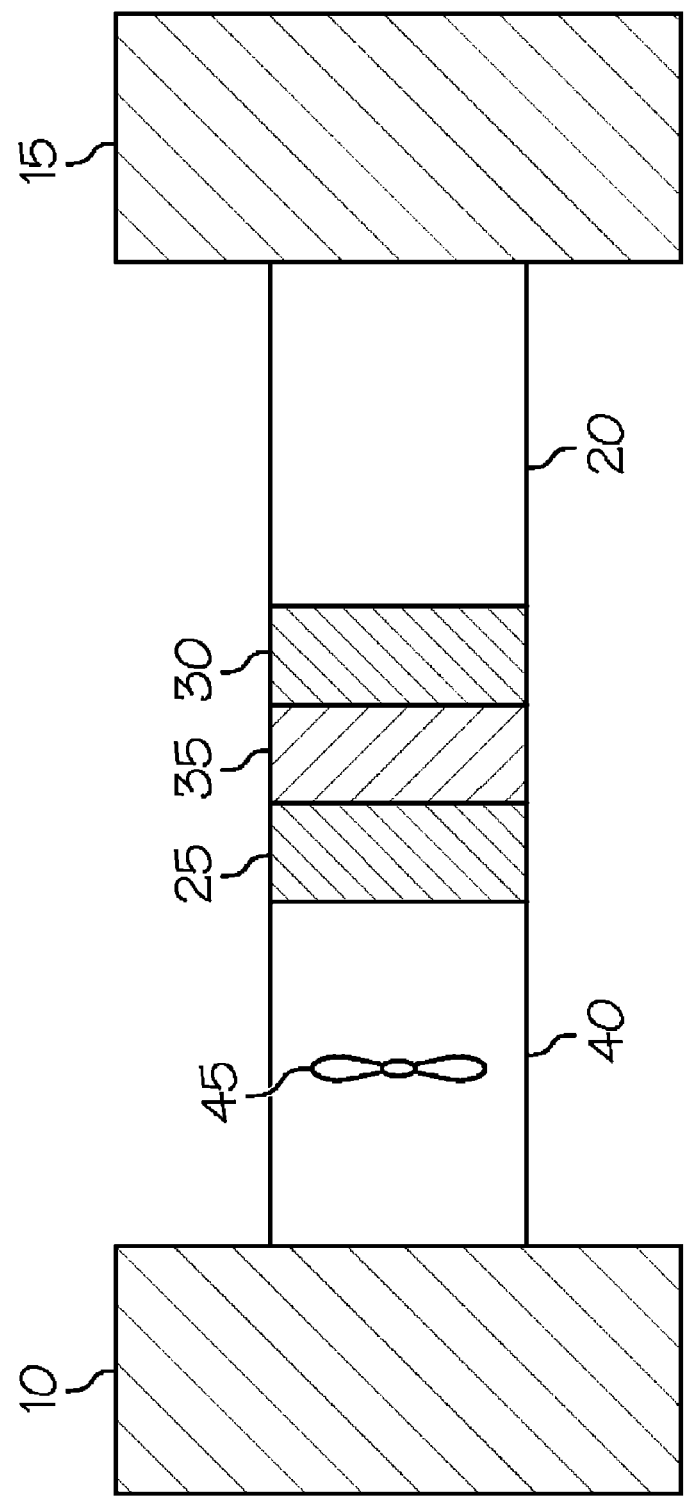

LITHIUM ION BATTERY FAILURE MITIGATION

BACKGROUND OF THE INVENTION

Lithium ion batteries have been used in conjunction with internal combustion engines (ICE). Normally, a battery pack's air circulation system draws air from, and returns air to, the environment around the pack including the vehicle's structural members but excluding the passenger cabin.

Although rare, lithium ion battery cells occasionally fail. When a lithium ion battery cell fails, gaseous and liquid electrolyte and certain combusted material vapors/fumes with associated smoke can be emitted from the ruptured cell. The smoke is the result of carbonate combustion and can contain fine carbonaceous particulate matter. Various vapors/fumes can be exhausted, such as dimethyl carbonate (DMC) and other high vapor pressure carbonates, hydrocarbons (HC, e.g., $C_xH_y$, where x can be zero), and carbon-oxides such as monoxide (CO) and carbon dioxide ($CO_2$). Under current practice, these gases are vented to the atmospheric environment around the pack including the vehicle's structural members but excluding the passenger cabin.

It would be desirable to treat the vapors/fumes formed in the event of a lithium ion battery cell failure.

SUMMARY OF THE INVENTION

The present invention meets this need. One aspect of the invention is a method of mitigating battery cell failure. In one embodiment, the method includes providing a coupling between a battery pack and an internal combustion engine exhaust system, the coupling comprising: a duct positioned between the battery pack and the internal combustion engine exhaust system, the duct including at least one one-way valve positioned to allow battery cell exhaust to pass from the battery cell to the internal combustion engine exhaust system; detecting a thermal event; activating a fan, an air pump, or both in response to the thermal event to force the battery cell exhaust through the coupling; and treating the battery cell exhaust in the internal combustion engine exhaust system.

Another aspect of the invention is a battery failure mitigation system. In one embodiment, the system includes a coupling positioned between a battery cell and an internal combustion engine exhaust system, the coupling comprising: a duct positioned between the battery cell and the internal combustion engine exhaust system, the duct including at least one one-way valve positioned to allow battery cell exhaust to pass from the battery cell to the internal combustion engine exhaust system.

BRIEF DESCRIPTION OF THE DRAWINGS

The FIGURE is an illustration of one embodiment of the coupling of the present invention.

DETAILED DESCRIPTION OF THE INVENTION

The present invention relates to the mitigation of the effects of a thermal failure of a device. It could be used with any self-contained device that could produce fumes and/or smoke in the event of failure, is normally vented to the atmosphere, and could be connected to the ICE exhaust system. The device include, but are not limited to, a battery cell, such as lithium ion battery cells, an electronic device, or a mechanical device. For convenience, the invention will be described with respect to a battery cell.

The exhaust system of an ICE is designed to filter particulate matter and to react partially combusted ICE exhaust constituents fully, resulting in a nearly transparent, silent, and odorless exhaust exit fume. One or more of the components of the ICE exhaust system (e.g., the filters, mufflers, and catalytic converters), can be used to treat the gases and particulate exhaust from a battery cell failure. This exhaust arrangement for the battery pack to treat its possible gases and particulate exhaust during a cell thermal event is hereafter referred to as the alternative exhaust arrangement.

It is impractical to feed the battery cell pack air circulation exhaust to the ICE's exhaust system all of the time. The pressure in the exhaust pipes would potentially allow (or force) the ICE's hot exhaust fumes to penetrate the battery cell pack and counteract the battery cell cooling. In addition, there could be other undesirable mechanical, thermal, and/or chemical effects. For example, because the ICE system produces exhaust at higher than atmospheric pressure, if the gas at higher pressure entered the battery pack and could not be vented quickly enough, the seals of the battery pack could fail. In addition, the hot gases could damage the electronics used to control the battery cells. Finally, the reactive gases formed in combustion could react with moisture in the air for example and cause the metal or plastic in the battery cell to degrade.

In the present invention, a thermal event triggers the activation of a valve system that forces the battery pack exhaust through the ICE's exhaust system.

During normal operation, the coupling between the battery pack and the ICE exhaust system, which includes the valve system, prevents engine exhaust, vibration, and heat from entering or affecting the battery cell pack.

When a thermal event is detected or suspected, the coupling forces the gases in the battery cell pack to be vented into the ICE exhaust system. The existence or suspected existence of a thermal event could be determined in a variety of ways. For example, the temperature, voltage, and current of the system are typically measured constantly. A trigger could be set so that if one or more of these conditions exceeds an acceptable range, the alternate exhaust arrangement would be activated. Alternatively (or in addition to temperature, voltage, and/or current triggers), the system could be set so that a collision and/or a high pressure event would trigger the alternate exhaust arrangement. Other triggers could also be used, including, but not limited to vapor sensors or smoke detectors, if desired. The triggers could be manual, such as a button that the driver could press in the event of a failure or accident, or remote, such as being activated by the fire department or a system like OnStar®. Desirably, the trigger is automatic.

The battery pack has an air inlet vent and an air outlet vent. When the alternate exhaust arrangement is triggered, the air inlet vent remains open, and the air outlet vent closes. As a result, air is drawn into the battery pack from the ambient environment, but not exhausted from the battery pack back into the ambient environment. Instead, the battery pack exhaust flows into the ICE exhaust system for treatment.

There is a coupling between the battery pack and the ICE exhaust system. The coupling includes a duct with at least one one-way valve. There can be an electrically driven fan or air pump fitted in the duct that is coupled to the battery cell pack. In another embodiment, the driven fan or air pump is connected to the air inlet vent. The duct is mechanically isolated and coupled to an extension of the ICE exhaust system, and the duct remains thermally isolated from the ICE exhaust system.

Suitable thermal barriers include, but are not limited to, various types of ceramic coatings, and insulation. For example, the duct can be thermally isolated using the ceramic coating described in U.S. Pat. No. 7,041,383, which is incorporated herein by reference. The ceramic coating comprises $[Nd_{0.5}Zr_{0.95}O_{1.75}Y_{0.06}]_{0.93}[Nd_2O_3]_{0.07}$ coated on stainless steel using a metallic bond coat of NiCrAlY and exhibits thermal conductivities between 0.72 and 1.06 W/mK from 600° C. to 1100° C.

The FIGURE shows a suitable coupling between the battery pack 10 and the ICE exhaust system 15. The air inlet vent and air outlet vent for the battery pack (not shown) are positioned away from the coupling. In this embodiment, there is duct 20 between the battery pack and the ICE exhaust system. There are two one-way valves 25, 30 which fit inside each end of a cylinder 35 that has been coated on the interior with a thermal barrier ceramic such as described above. The thermal ceramic barrier coating can also be used on the metal flap surfaces of the valves, if desired. This arrangement should isolate most of the heat from the normal ICE exhaust from the battery pack that is transferred by conduction and convection. Radiative heat transfer can be addressed by the use of additional and suitably reflective coatings. Evacuating the air in the thermal barrier between the valves would reduce the heat transferred by conduction and convection even further. The use of two one-way valves helps to isolate the battery pack thermally from the ICE exhaust system. However, the use of two one-way valves is not required, and other arrangements are possible. The duct can be one piece or it can be made up of separate pieces, as desired.

The one-way valve 25 (cold) is positioned on the battery pack side of the thermal barrier. The one-way valve 30 (hot) is positioned on the ICE exhaust side of the thermal barrier. The one-way valves 25, 30 prevent the ICE exhaust from entering the battery cell pack 10.

A flexible hose or tubing section 40 between the coupling and the battery cell pack 10 mechanically isolates the battery cell pack 10 from the vibrations in the ICE exhaust system 15. Alternatively, all of the duct 20 could be made of flexible tubing.

There is typically a fan or air pump 45 that forces the air from the battery pack to the ICE exhaust system 15. In one embodiment, the fan or air pump 45 is positioned in the duct 20. The fan/air pump could be one the cold side of the one-way valve, the hot side of the one-way valve, or both sides. Alternatively, the fan or air pump could be connected to the air inlet vent, or the air outlet vent. The fan or air pump could be connected to an alternate vent that would normally be closed, but which would become an air intake vent if the alternate exhaust arrangement is triggered. There could be one or more fans or air pumps. A fan/air pump may not be required in some cases because the pressure in the battery pack may be sufficient to force the flow to the ICE exhaust system.

When a thermal event occurs, the alternate battery pack exhaust path is triggered. The fan or air pump 45 begins to operate, forcing the battery pack exhaust through the duct 20, the cold one-way valve 25, the thermal barrier, and the hot one-way valve 30 and into the ICE exhaust system 15 where it is filtered and treated using the existing exhaust system components, including, but not limited to, either a standard or modified catalytic converter, particulate filter and muffler.

As an example, the ICE exhaust system could include a hydrocarbon (HC) trap in series with a platinum group metal (PGM) three way catalyst based catalytic converter. The HC trap can include a zeolite and/or metal organic frameworks (MOF). An exhaust gas aftertreatment system for treating an engine-out exhaust gas feedstream of an internal combustion engine can include a multi-stage catalytic converter comprising a converter inlet, a converter outlet, and a substrate having a first end associated with the converter inlet and a second end associated with the converter outlet. The substrate further includes a multiplicity of flow passages between the first and second ends of the substrate, a first surface location corresponding to the first end of the substrate, and a second surface location corresponding to the second end of the substrate. A first washcoat stage is applied to the substrate at the first surface location corresponding to the first end of the substrate. A second washcoat stage is applied to the substrate at the second surface location corresponding to the second end of the substrate. Other arrangements and components could be used in the ICE exhaust system, as is well known in the art.

The ICE exhaust system would be connected to both the engine and the coupling. For example, there could be a branch, perhaps shaped like a "Y" or "T", in the exhaust flow path between the engine and the ICE exhaust system. One part of the branch would connect the engine to the ICE exhaust system, and the other part of the branch would connect the coupling to the ICE exhaust system.

If the engine is running when the battery cell fails, the battery exhaust will be treated by the catalytic converter. If the battery cell fails when the engine is not running, the catalytic converter will be cold. In this case, the HC trap will store the battery cell exhaust gases. Then, when the engine is running (or by some other means of warming the HC trap), and the catalytic converter is warm, the absorbed gases will be released from the HC trap and converted over the three way catalyst.

The HC trap and/or other exhaust components that treat the chemicals emitted from a battery pack during a thermal failure could be designed as single use system. After a thermal event occurs and the alternate exhaust path is triggered, the components would be used destructively and subsequently replaced. Part or all of the battery pack may need to be replaced due to its failure. In addition, the HC trap, the particulate trap, and the catalytic converter may need to be replaced following the triggering of the alternate exhaust arrangement, depending on the amount of impurities that have to be processed. The coupling, valve(s), and fan may also have to be replaced. Logistically, this is reasonable given that after a cell thermal event, the vehicle will have to be serviced professionally. Financially, this strategy removes the necessity of incorporating exceedingly robust exhaust components at higher weight and financial costs to accommodate an event that may never happen.

While preferred modes for carrying out the invention have been described in detail, those familiar with the art to which this invention relates will recognize various alternative designs and embodiments for practicing the invention within the scope of the appended claims.

What is claimed is:

1. A method of mitigating battery cell failure comprising:
providing a coupling between a battery pack and an internal combustion engine exhaust system, the coupling comprising:
a duct positioned between the battery pack and the internal combustion engine exhaust system, the duct including at least one one-way valve positioned to allow battery cell exhaust to pass from the battery cell to the internal combustion engine exhaust system;
detecting a thermal event;
forcing the battery cell exhaust through the coupling; and
treating the battery cell exhaust in the internal combustion engine exhaust system.

2. The method of claim 1 wherein the battery cell exhaust is forced through the coupling by activating a fan or air pump or both.

3. The method of claim 2 wherein the fan or the air pump or both is located in the duct.

4. The method of claim 1 wherein the battery pack includes an air inlet vent and an air outlet vent, further comprising closing the air outlet vent when the thermal event is detected.

5. The method of claim 2 wherein the fan or the air pump or both is connected to the air inlet vent.

6. The method of claim 1 wherein at least a portion of the duct is made of a flexible tube.

7. The method of claim 1 wherein the coupling further comprises a thermal isolation component between the battery cell and the internal combustion engine exhaust system.

8. The method of claim 6 wherein the thermal isolation component is selected from a cylinder coated with a thermal barrier ceramic coating, insulation, or both.

9. The method of claim 7 wherein the thermal isolation component is the cylinder coated with the thermal barrier ceramic coating, and wherein air is evacuated from the cylinder.

10. The method of claim 1 further comprising replacing a damaged exhaust system component after the thermal event has occurred.

11. The method of claim 1 wherein there are a pair of one-way valves separated by a thermal isolation component.

12. A battery failure mitigation system for use in conjunction with an automotive internal combustion engine exhaust system, the failure mitigation system comprising:
   a coupling configured to be positioned between a battery cell and an internal combustion engine such that upon connection therebetween, the exhaust system is in selective fluid communication with the coupling, the coupling comprising:
   a duct including at least one one-way valve positioned to allow battery cell exhaust to pass from the battery cell to the engine exhaust system; and
   a trigger configured to receive indicia of an event such that upon receipt thereof, the trigger cooperates with the coupling to force the battery cell exhaust in the duct to be vented to the exhaust system.

13. The system of claim 12 further comprising a fan, an air pump, or both.

14. The system of claim 12 wherein at least a portion of the duct is made of is a flexible tube.

15. The system of claim 12 further comprising a thermal isolation component between the battery cell and the internal combustion engine exhaust system.

16. The system of claim 15 wherein the thermal isolation component is selected from a cylinder coated with a thermal barrier ceramic coating, insulation, or both.

17. The system of claim 16 wherein the thermal isolation component is the cylinder coated with the thermal barrier ceramic coating, and wherein air is evacuated from the cylinder.

18. The system of claim 12 wherein there are a pair of one-way valves.

19. The system of claim 18 wherein the pair of one-way valves are separated by a thermal isolation component.

20. The system of claim 19 wherein the thermal isolation component is selected from a cylinder coated with a thermal barrier ceramic coating, insulation, or both.

21. A battery failure mitigation system for use in conjunction with an automotive internal combustion engine exhaust system, the failure mitigation system comprising a coupling positioned between a battery cell and the exhaust system such that upon receipt of indicia of a triggering event, the coupling forces an exhaust produced by the battery cell to be vented to the exhaust system, the coupling comprising:
   a duct positioned between the battery cell and the internal combustion engine exhaust system to establish fluid communication therebetween,
   a pair of one-way valves positioned in the duct to allow the battery cell exhaust to selectively pass from the battery cell to the exhaust system;
   at least a portion of the duct between the pair of one way valves coated with a thermal barrier ceramic coating, wherein air is evacuated from the portion of the duct between the air of one-way valves; and
   a fan, an air pump, or both;
   wherein at least a portion of the duct is made of a flexible material.

* * * * *